United States Patent
O'Byrne et al.

(10) Patent No.: US 9,477,385 B2
(45) Date of Patent: *Oct. 25, 2016

(54) METHODS AND SYSTEMS FOR MANAGING A GRAPHICAL USER INTERFACE

(71) Applicant: Citibank, N.A., New York, NY (US)

(72) Inventors: David Niall O'Byrne, Tanjong Pagar (SG); Alaa Abdulkhaleq Saeed, London (GB); Ashvin Parkash, Kenley (GB); Wyatt Alexander Flores, New York, NY (US); Vanderlei Cardoso da Silva, New Providence, NJ (US); Ori Anavim, Brooklyn, NY (US); Kumaravel Kannan Nagarajan, Hillsborough, NJ (US); Andrew Robert Blackman, Guildford (GB); Naveenprasad Subbiyan, London (GB); Krishnaraj Rajagopalan, London (GB); Laura Krystyna Lingard Turner, London (GB)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,113

(22) Filed: Feb. 5, 2015

(65) Prior Publication Data
US 2015/0177942 A1      Jun. 25, 2015

Related U.S. Application Data

(63) Continuation of application No. 13/767,126, filed on Feb. 14, 2013, now Pat. No. 8,984,439.

(51) Int. Cl.
*G06F 3/048* (2013.01)
*G06F 3/0484* (2013.01)
*G06F 9/44* (2006.01)

(52) U.S. Cl.
CPC ........... *G06F 3/0484* (2013.01); *G06F 9/4443* (2013.01)

(58) Field of Classification Search
CPC .. G06F 3/0484; G06F 9/4443; G06F 3/0481; G06F 3/0488
See application file for complete search history.

(56) References Cited

U.S. PATENT DOCUMENTS 5,590,264 A * 12/1996 Keane ................. G06F 3/04817
                                                  715/838
5,712,995 A *  1/1998 Cohn .................... G06F 3/0481
                                                  715/792

(Continued)

FOREIGN PATENT DOCUMENTS

CN         101609387 A1    12/2009
GB           2387245 A1    10/2003

(Continued)

OTHER PUBLICATIONS

Allsnap Demonstration Feb. 26, 2007, pp. 1-5 http://www.youtube.com/watch?v=sxMBUmqAhJw.*

(Continued)

*Primary Examiner* — Scott Baderman
*Assistant Examiner* — Mario M Velez-Lopez
(74) *Attorney, Agent, or Firm* — John M. Harrington, Esq.; Johnson, Marcou & Isaacs, LLC

(57) ABSTRACT

Methods and systems for managing a graphical user interface involve, for example, defining, using a processor coupled to memory, a threshold distance between windows on a display screen at which a mutual attraction between the windows is activated to draw the windows together as components of a picture of windows. Also using the processor, all windows of a same functional type that are components of the picture of windows are resized simultaneously without affecting the size of windows of other functional types that are also components of the picture of windows. Likewise using the processor, all windows on the display screen are maintained in an active state regardless of a focus of a user input device.

16 Claims, 8 Drawing Sheets

(56) References Cited

U.S. PATENT DOCUMENTS

| | | | | |
|---|---|---|---|---|
| 5,819,055 | A * | 10/1998 | MacLean | G06F 3/0481 715/798 |
| 5,926,806 | A * | 7/1999 | Marshall | G06F 17/30572 707/752 |
| 6,166,736 | A * | 12/2000 | Hugh | G06F 3/0481 715/777 |
| 6,505,246 | B1 * | 1/2003 | Land | G06F 11/323 709/224 |
| 6,661,436 | B2 * | 12/2003 | Barksdale | G06F 3/0486 715/788 |
| 6,874,128 | B1 | 3/2005 | Moore et al. | |
| 7,266,768 | B2 * | 9/2007 | Ferlitsch | G06F 17/24 715/273 |
| 7,818,684 | B1 * | 10/2010 | Smith | G06F 3/0481 715/794 |
| 7,904,832 | B2 * | 3/2011 | Ubillos | G06F 3/0483 715/716 |
| 8,060,908 | B2 * | 11/2011 | Bountour | H04N 7/181 725/141 |
| 8,136,047 | B2 * | 3/2012 | Holecek | G06F 3/048 715/733 |
| 8,386,856 | B2 | 2/2013 | Yang | |
| 8,386,956 | B2 * | 2/2013 | Ording | G06F 3/0481 715/788 |
| 8,464,177 | B2 * | 6/2013 | Ben-Yoseph | G06F 3/0481 715/792 |
| 8,549,429 | B2 * | 10/2013 | Tsuruta | G06F 3/0481 715/767 |
| 8,775,955 | B2 * | 7/2014 | Zendler | G06F 3/04815 707/999.005 |
| 8,984,439 | B2 * | 3/2015 | O'Byrne | G06F 9/4443 715/788 |
| 9,310,888 | B2 * | 4/2016 | Dickinson | G06F 3/017 |
| 2005/0015774 | A1 * | 1/2005 | Kotani | G06F 9/542 719/310 |
| 2006/0129475 | A1 * | 6/2006 | Badenhorst | G06Q 40/04 705/37 |
| 2007/0250788 | A1 * | 10/2007 | Rigolet | G06F 3/0481 715/788 |
| 2008/0034317 | A1 * | 2/2008 | Fard | G06F 3/0481 715/781 |
| 2008/0115081 | A1 * | 5/2008 | Sankaravadivelu | G06F 3/0481 715/783 |
| 2009/0064035 | A1 * | 3/2009 | Shibata | G06F 3/0481 715/803 |
| 2010/0088627 | A1 * | 4/2010 | Enkerud | G06F 9/4443 715/777 |
| 2010/0100470 | A1 * | 4/2010 | Buchanan | G06Q 10/10 705/35 |
| 2010/0259560 | A1 * | 10/2010 | Jakobson | G06F 21/62 345/629 |
| 2011/0087989 | A1 * | 4/2011 | McCann | G06F 3/04817 715/772 |
| 2011/0196812 | A1 * | 8/2011 | Jezek, Jr. | G06F 3/048 705/36 R |
| 2012/0066628 | A1 * | 3/2012 | Ens | G06F 17/30905 715/769 |
| 2012/0084717 | A1 * | 4/2012 | Yao | G06F 3/0481 715/792 |
| 2012/0084747 | A1 | 4/2012 | Chakradhar et al. | |
| 2012/0131442 | A1 * | 5/2012 | Grizim | G06F 17/24 715/234 |
| 2012/0144309 | A1 * | 6/2012 | Zendler | G06F 3/04815 715/739 |

FOREIGN PATENT DOCUMENTS

| | | | |
|---|---|---|---|
| WO | | 0057281 A1 | 9/2000 |
| WO | WO2004036410 A1 | | 4/2004 |
| WO | WO2010035162 A2 | | 4/2010 |

OTHER PUBLICATIONS

Allsnap Demonstration Feb. 26, 2007, http://www.youtube.com/watch?v=sxMBUmqAhJw, Feb. 26, 2007, 1-5.
International Search Report and Written Opinion dated Mar. 10, 2014 for PCT/US14/15821, Mar. 10, 2014, 1-13.
Non-Final Office Action dated Jul. 3, 2014 for U.S. Appl. No. 13/767,126, Jul. 3, 2014, 1-19.
Non-Final Office Action dated Jul. 5, 2013 for U.S. Appl. No. 13/767,126, Jul. 5, 2013, 1-19.
Allsnap—Snap Open Windows Together, Dec. 15, 2005, http://downloadsquad.switched.com/2005/12/15/allsnap-snap-open-windows-together-todays-mod/, Dec. 15, 2005, 1 page.
Final Office Action dated Dec. 18, 2013 for U.S. Appl. No. 13/767,126, Dec. 18, 2013, 1-20.
10 Minute Guide to Windows 3.1, 1992, 1-3.
"Allsnap", Freewarewiki, Nov. 22, 2010, http://hintsforums.macworld.com/showthread.php?t=82656, Nov. 22, 2010, 1-6.
"How to Resize All Windows", Hintsforum.macworld.com, http://hints.forums.macworld.com/showthread.php?t=82656., Apr. 2008, 1-6.
"Magnetic Windows", IP.com No. IPCOM000123936D, http://ip.com/IPCOM/000123936, Jul. 1, 1999, 1-3.
RD423108 A, Int. Business Machines Corp (IBMC-C), Jul. 10, 1999, Abstract Only, Jul. 10, 1999, 1-4.
Bly, et al., "A Comparison of Tiled and Overlapping Windows", CHI '86 Proceedings, Apr. 1986, ISBN: 0-8791-180-6 doi>10.1145/22627.22356, http://dl.acm.org/citation.cfm?doid=22627.22356., Apr. 1986, 1-6.
Feng, et al., "Attending to Large Dynamic Displays," CHI 2008, Apr. 5-Apr. 10, 2008, Apr. 5, 2008, 2745-2750.
Ishak, et al., "Content-Aware Layout," CHI 2007, Apr. 28-May 3, 2007, Apr. 28, 2007, 2459-2464.
Regan, et al., "Bumping Windows between Monitors," Technical Report MSR-TR 2003-13, Microsoft Research Microsoft Corporation, Mar. 12, 2003, 1-10.
Supplementary European Search Report for co-pending European Patent Application No. 14751039.0, Aug. 11, 2016, 9.

* cited by examiner

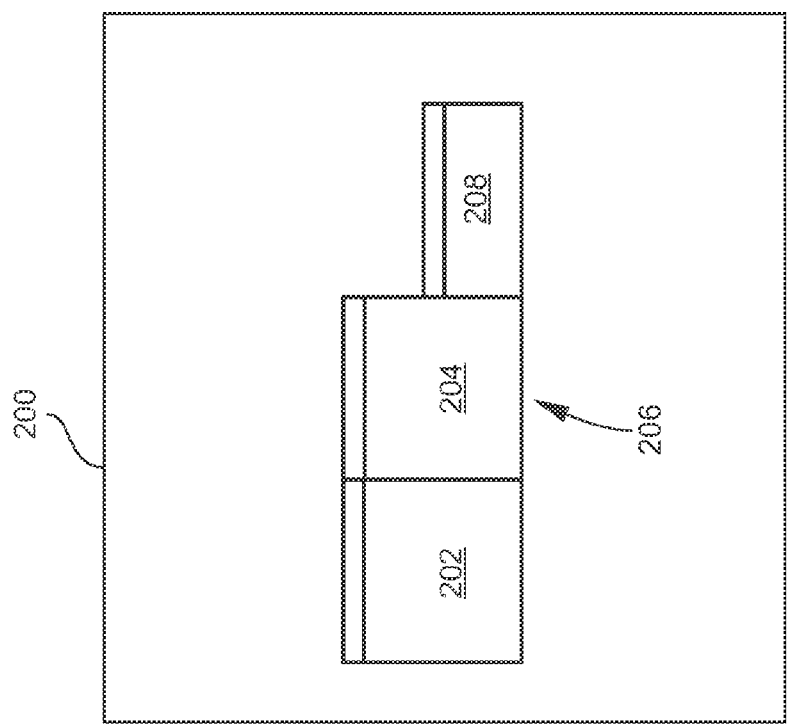
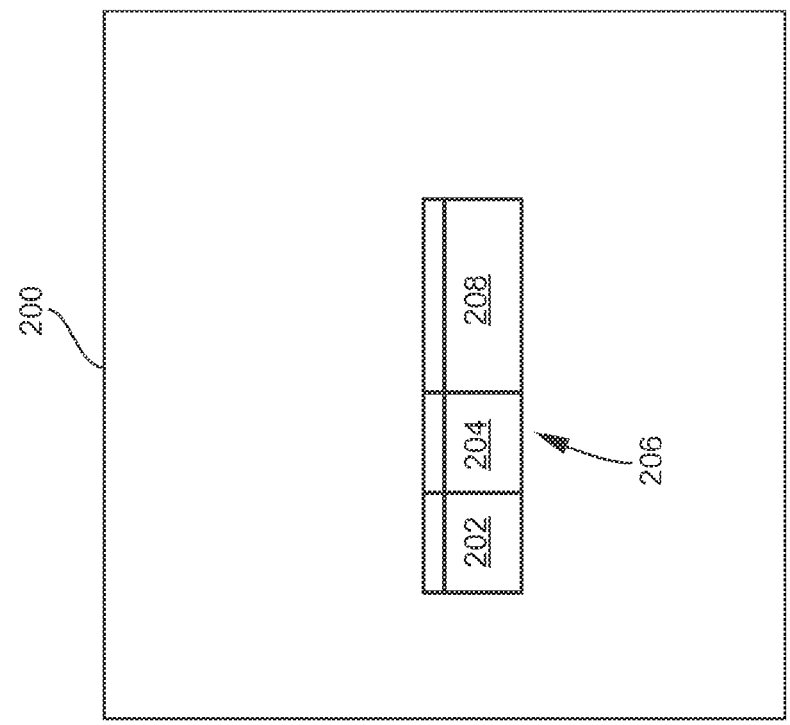
Fig. 2

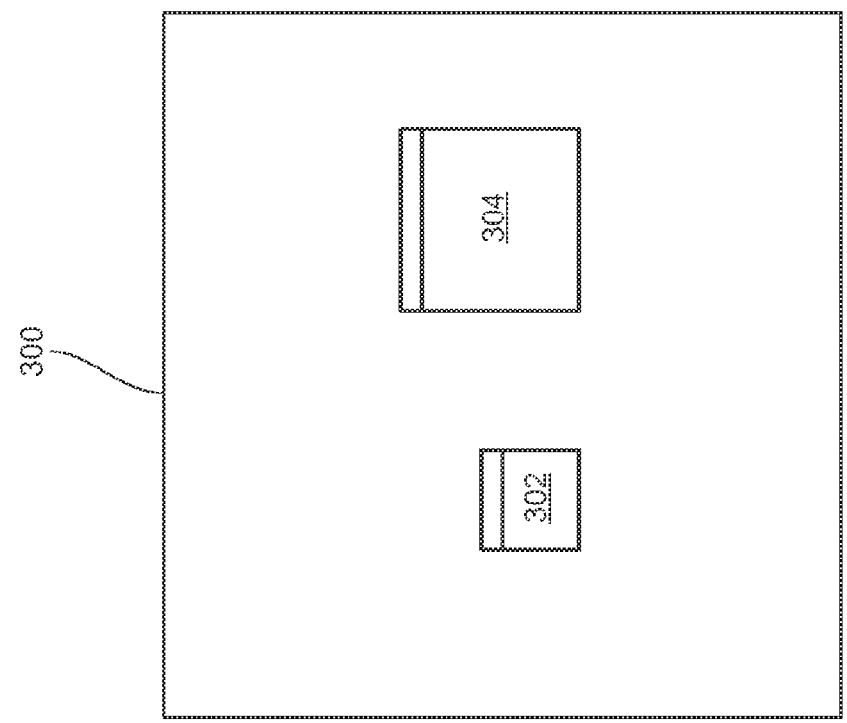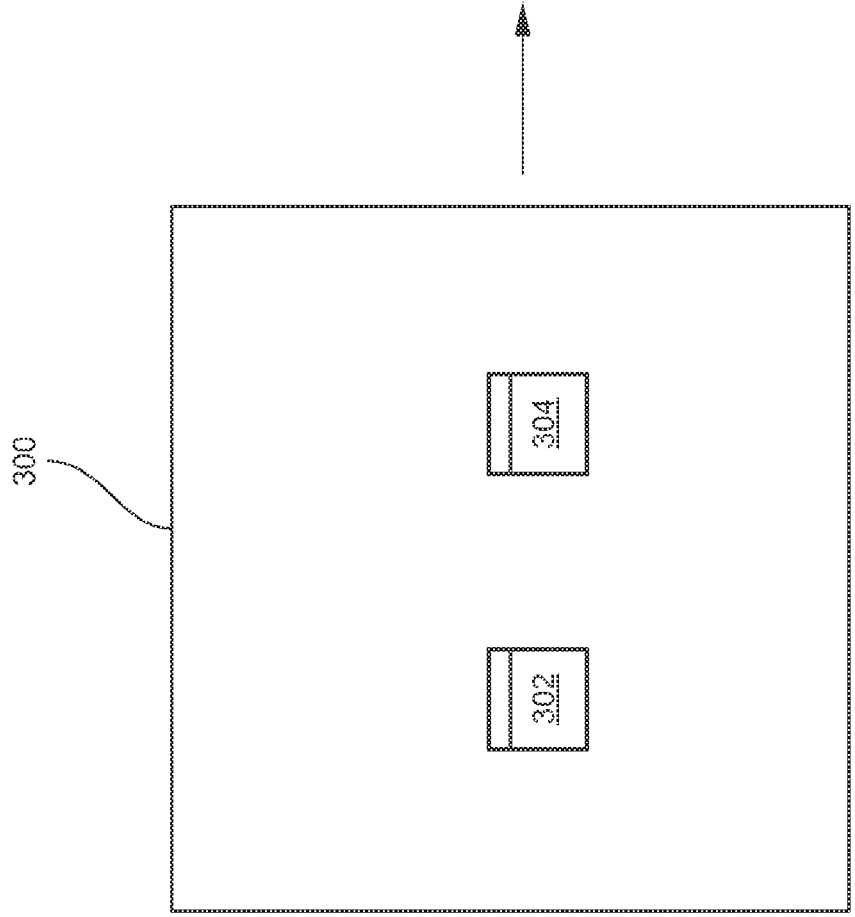
Fig. 3

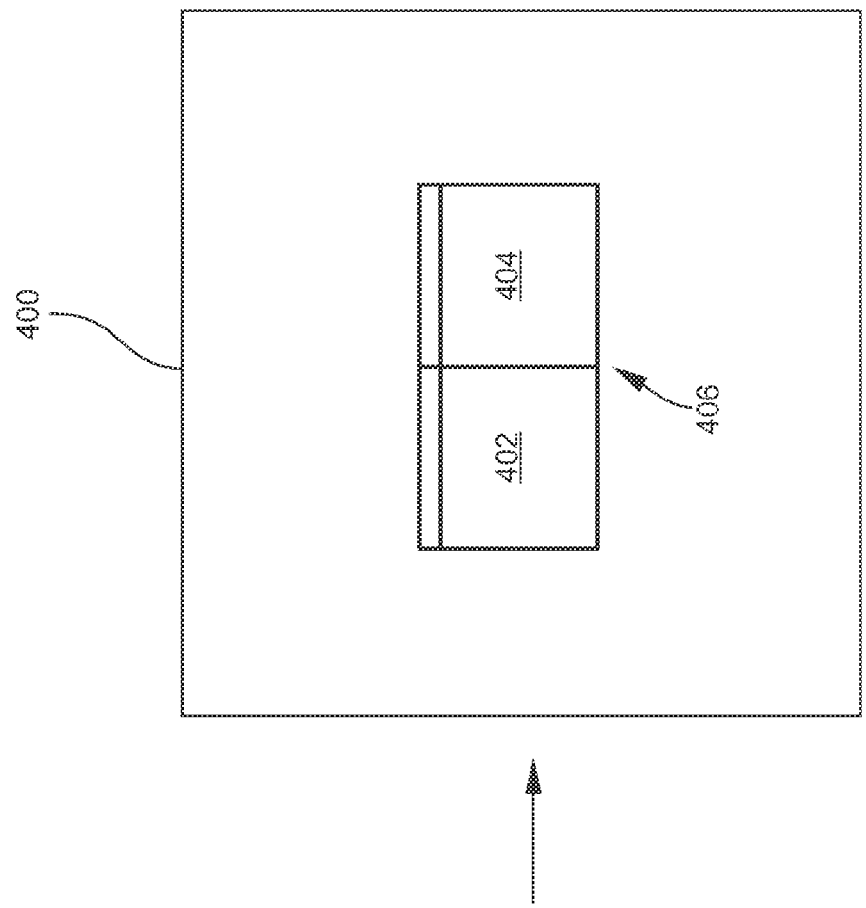
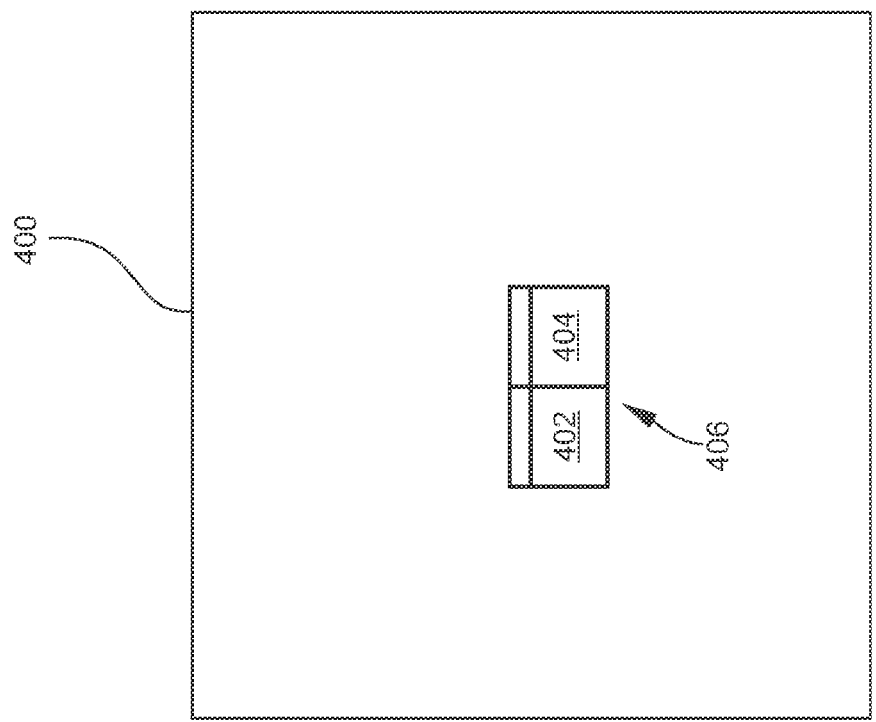
Fig. 4

METHODS AND SYSTEMS FOR MANAGING A GRAPHICAL USER INTERFACE

PRIORITY APPLICATION

This application is a continuation of co-pending U.S. patent application Ser. No. 13/767,126 filed Feb. 14, 2013, entitled "Methods and Systems for Managing a Graphical User Interface", which is incorporated herein by this reference.

FIELD OF THE INVENTION

The present invention relates generally to the field of finance, and more particularly to methods and systems managing a graphical user interface (GUI) displaying and manipulating financial data, such as foreign exchange (FX) trading data.

BACKGROUND OF THE INVENTION

A current problem in electronic trading, such as electronic FX trading, is a lack of space on display screens of traders' computing devices, such as traders' desktop computers. For example, a trader may have many screens open at the same time, each of which may be fully populated to the extent of being cluttered with trade monitors, prices, spreadsheets, curves, trading platforms, charts, trade blotters, P&Ls and the like. When that clutter is stretched to include multiple systems, there is an even more serious lack of desktop space. Thus, it is not surprising that traders ultimately find that there is little or no space on their display screens for products which the traders may wish to include. That is a problem for both the providers who want traders' screen space for their products and the traders who are unable to receive all of the information or have access to all of the applications that they need.

There is a need for a method and system for managing a graphical user interface (GUI) that provides efficiency in the use of display screen space in a way that allows users, such as FX traders, a high degree of flexibility to customize their trading requirements around their day-to-day work requirements on their workstation, such as their desktops, that is not possible using traditional GUI presentation methods and systems.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the GUI management described herein.

Embodiments of the invention provide methods and systems for managing a graphical user interface that may involve, for example, defining, using a processor coupled to memory, a threshold distance between windows on a display screen at which a mutual attraction between the windows is activated to draw the windows together as components of a picture of windows; resizing, using the processor, all windows of a same functional type that are components of the picture of windows simultaneously without affecting a size of windows of other functional types that are also components of the picture of windows; and maintaining, using the processor, all windows on the display screen in an active state regardless of a focus of a user input device.

In an aspect of embodiments of the invention, defining the threshold distance between windows on the display screen may involve, for example, defining the threshold distance between edges of the windows on the display screen at which the mutual attraction between the windows is activated. In another aspect, defining the threshold distance between windows on the display screen may involve, for example, defining the threshold distance between the windows on the display screen at which the mutual attraction between the windows is activated regardless of a state of alignment of the windows relative to one another. In a further aspect, defining the threshold distance between the windows on the display screen at which the mutual attraction between the windows is activated regardless of the state of alignment of the windows relative to one another may involve, for example, aligning the windows neatly and precisely to one another when the mutual attraction between the windows is activated.

In an additional aspect of embodiments of the invention, defining the threshold distance between windows on the display screen may involve, for example, defining the threshold distance between the windows on the display screen at which the mutual attraction between the windows is activated to draw the windows together without overlapping. In another aspect, defining the threshold distance between windows on the display screen may involve, for example, defining a threshold distance between a moving window and a stationary window of a same functional type on the display screen. In still another aspect, defining the threshold distance between the moving window and the stationary window of the same functional type on the display screen may involve, for example, resizing the moving window from a size larger or smaller than a size of the stationary window of the same functional type to a same size as the size of the stationary window of the same functional type when the mutual attraction is activated.

In a further aspect of embodiments of the invention, defining the threshold distance between windows on the display screen may involve, for example, displaying an indicator on the display screen when the mutual attraction is activated. In a still further aspect, displaying the indicator on the display screen when the mutual attraction is activated may involve, for example, deactivating the mutual attraction in response to a user input signal and overlapping or superposing the windows on the display screen. In still another aspect, defining the threshold distance between windows on the display screen may involve, for example, moving all components of the picture of windows together as a single unit from one location to another location on the display screen displayed on one or more visual display units in response to a single input signal. In an additional aspect, defining the threshold distance between windows on the display screen may involve, for example, defining the threshold distance for activation of mutual attraction between the windows as a fixed parameter. In another aspect, defining the threshold distance between windows on the display screen may involve, for example, defining the threshold distance for activation of mutual attraction between the windows as a user-adjustable parameter.

In a still further aspect of embodiments of the invention, resizing all windows of the same functional type may involve, for example, resizing all windows of the same functional type that are components of the picture of windows simultaneously in response to a single input signal. In an additional aspect, resizing all windows of the same functional type may involve, for example, resizing all windows of the same functional type that are components of the picture of windows simultaneously without affecting the size of windows of different functional type that are not components of the same picture of windows.

In still another aspect of embodiments of the invention, maintaining all windows on the display screen in the active state may involve, for example, maintaining all windows on the display screen in the active state while resizing. In a further aspect, maintaining all windows on the display screen in an active state while resizing may involve, for example, maintaining a data feed to all windows on the display screen while resizing. In an additional aspect, maintaining all windows on the display screen in the active state may involve, for example, maintaining all overlapped or superposed windows on the display screen in the active state. In a still further aspect, maintaining all overlapped or superposed windows on the display screen in the active state may involve, for example, providing active tabs on overlapping or superposing windows for all overlapped or superposed windows on the display screen.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 2 illustrates an example of the dynamic resizing of windows aspect for embodiments of the invention;

FIG. 3 illustrates an example of the dynamic resizing of separate windows of a similar type for embodiments of the invention;

FIG. 4 illustrates an example of dynamic resizing of windows of a similar type in a picture of windows for embodiments of the invention;

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention. Embodiments of the invention provide methods and systems for managing and maximizing the usefulness of a GUI display, for example, for traders, such as FX traders, that are highly flexible and that enable traders to customize their trading requirements around their day-to-day work requirements on their desktops. Thus, embodiments of the invention provide a method of managing a GUI, for example, for an FX trading platform that is both a highly flexible and a very functional trading tool that adds value for traders.

Figure 1:
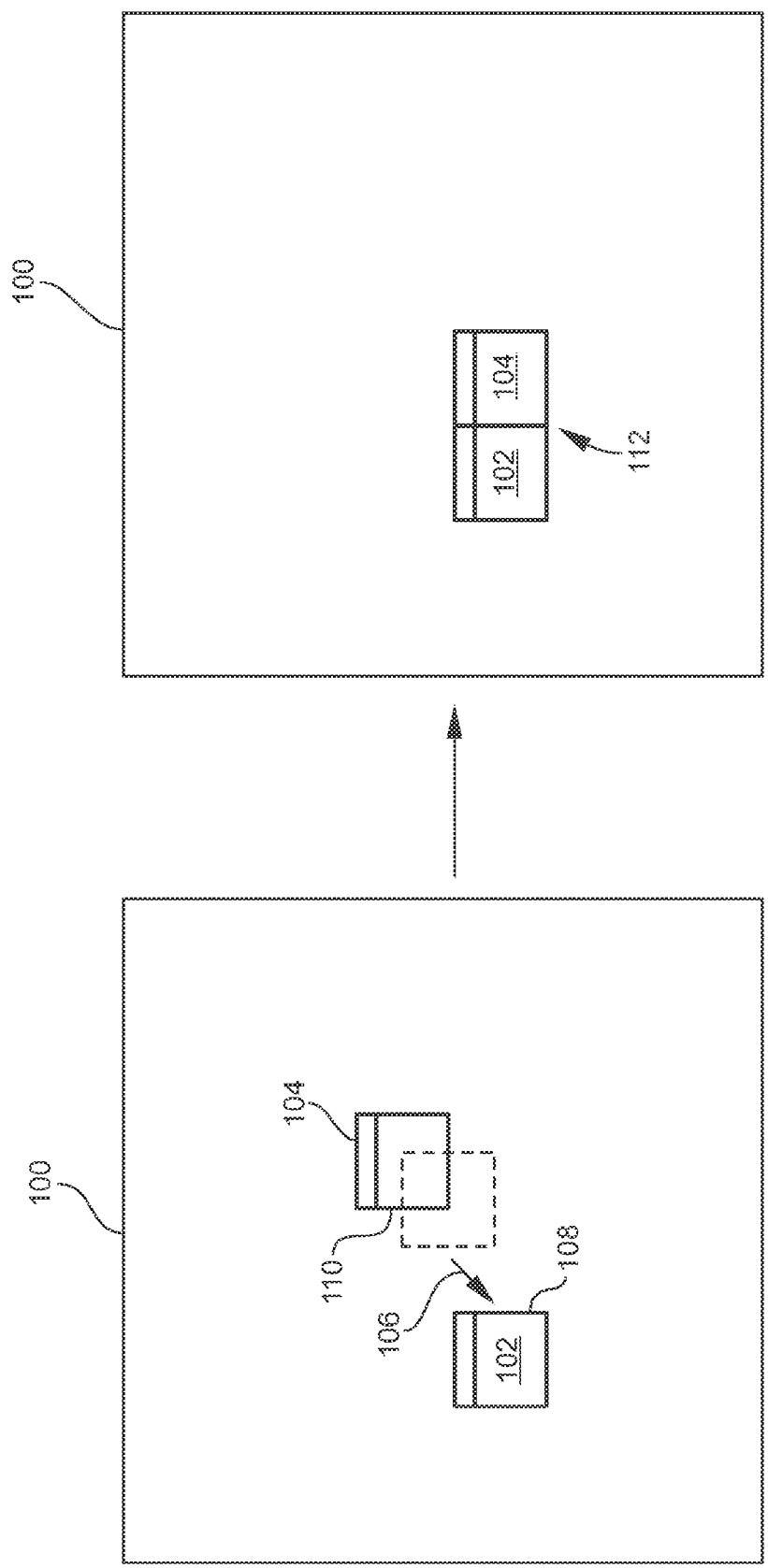
FIG. 1 illustrates an example of the 'magnetization' of windows aspect for embodiments of the invention.

The GUI management systems and methods for embodiments of the invention may include, for example, a 'magnetization' of windows aspect, an example of which is illustrated in FIG. 1. Referring to FIG. 1, in the 'magnetization' aspect, a user may 'magnetize' windows 102, 104 together simply by bringing them into proximity to one another on a display screen 100, for example, in arrow direction 106. Thus, windows of various shapes, sizes and functions may be 'magnetized' with a 'jump to' function that detects the window's approach to another window and behaves similarly to a true magnet, for example, such that the respective edges 108, 110 of the two windows 102, 104 need not be substantially precisely aligned with one another for the 'jump to' function to engage. In the magnetization aspect, as the windows 102, 104 move closer together, they attract one another. The 'magnetization' aspect allows users to 'stick' or 'magnetize' the windows 102, 104 together along their common edges 108, 110 effortlessly without any precise or multiple cursor movements and without overlapping one on top of the other simply by dragging one window 104 into proximity to another window 102. Thus, the 'magnetization' aspect enables the user to avoid, for example, having windows of various shapes and sizes hidden or partially hidden behind other windows of various shapes and sizes. When any number of windows, such as windows 102 and 104, are joined together in this fashion, the combination may be referred as a picture of windows, 112.

The GUI for embodiments of the invention launches in a completely flexible space. The elements of the GUI management application, such as a Euro/US dollar price tile may be launched from a dock and dragged and dropped at a desired location on a user's display screen. Likewise, a US dollar/Turkish lira price tile may be selected to bring up an options module on the user's display screen and, for example, may be extended. In embodiments of the invention, windows may be continually launched and loaded and all are interlinked. Thus, one window may lead to another window seamlessly without requiring the user to return to the dock. An advantage of this function over the way a standard application window typically works, for example, is that it enables a highly competitive trader to have one source's price in an FX trade quickly displayed on the trader's screen against one or more other source's prices for the same FX trade also displayed on the trader's screen.

The GUI management systems and method for embodiments of the invention may also include, for example, a dynamic resizing of windows aspect, an example of which is illustrated in FIG. 2. In the dynamic resizing aspect, all windows on the display screen 200 dynamically resize and remain live or active while resizing. Thus, real time pricing data continues to stream to a price window while the window resizes. Referring to FIG. 2, dynamic resizing of windows also retains independence such that all windows of a similar type (i.e., of a similar functionality captured within the window), such as price windows 202, 204, within a picture of windows 206 may resize together, while other window types, such as a chart window 208, do not resize. This aspect may be subject to the configuration which the user defines with regard to ideal proportions for the user's preference of various window types and to the overall shape and size of the picture of windows.

Further, in the dynamic resizing aspect, within a picture of windows, similar window types may behave differently and resize independently, depending on their location. For example, a US dollar/Turkey lira price tile window and a Great Britain pound/US dollar price tile window are similar types of windows that are both functional. FIG. 3 illustrates an example of the dynamic resizing of separate windows of a similar type for embodiments of the invention. Referring to FIG. 3, when two similar types of windows, such as price tile windows 302, 304, are separated from one another on the display screen 300, they may resize independently of one another. FIG. 4 illustrates an example of the dynamic resizing of windows of a similar type in a picture of windows for embodiments of the invention. Referring to FIG. 4, when the price tile windows 402, 404 are brought into proximity to one another on the display screen 400 and the magnetization aspect is used to 'stick' or 'magnetize' the two price tile windows together to form picture of windows 406, they may resize dynamically, meaning they may resize together at the same time.

Referring again to the 'magnetization' aspect illustrated in FIG. 1, as long as the two windows 102, 104 are spaced from one another by a predetermined distance, the 'jump to' function is inactive, but as one of the two windows 104 is dragged to a position near the other window, its 'jump to' function activates. Thus, as one 104 of the two windows approaches the other window 102, an indicator, such as a line, may appear on a side 110 of the approaching window 104 nearest the other window 102 to indicate that the 'jump to' function is activated. When the indicator appears, the user may release the window 104 that is being dragged, whereupon it will jump or snap into place adjacent the other window 102 as if attracted to it by magnetism. When snapped together in such manner, the two windows may form a picture of windows 112 that may be dragged around the display screen 100 together and may dynamically resize together as illustrated in FIG. 4. At any time thereafter, the user may simply click on an icon to un-dock or separate the two windows 102, 104 from one another.

Figure 5:
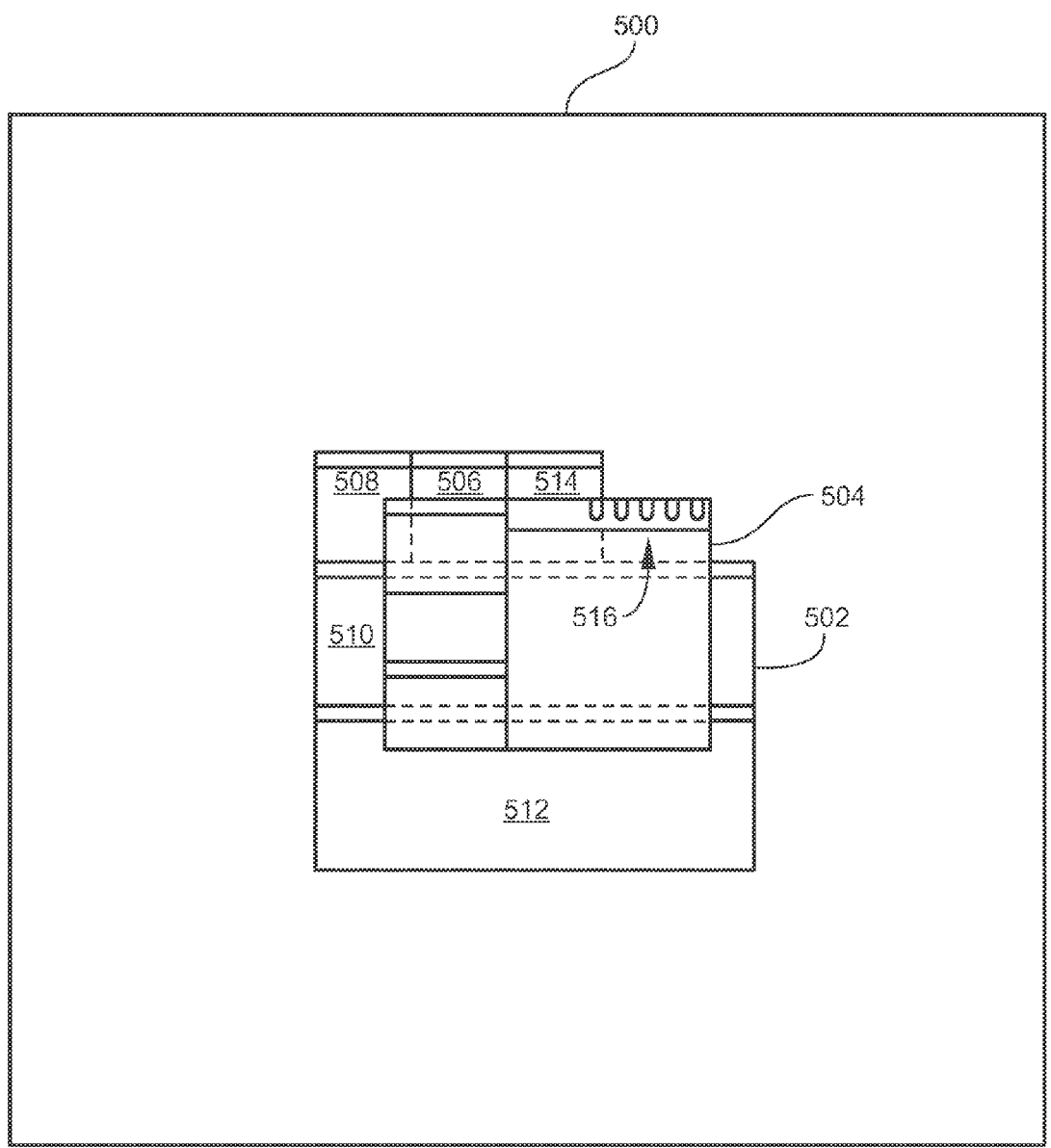
FIG. 5 illustrates an example of the tabbing aspect for embodiments of the invention.

Another aspect of the GUI management systems and methods for embodiments of the invention may be, for example, a tabbing aspect, an example of which is illustrated in FIG. 5. Referring to FIG. 5, in the 'tabbing' aspect, pictures of windows of various shapes and sizes, such as picture of window 502, may be overlapped by simply dragging and dropping one or more other pictures of windows, such as picture of windows 504, onto it. For example, the user may 'hide' a larger picture of windows 502 having a complex shape behind a smaller picture of windows 504 having a less complex shape. Assume, for example, that the user 'snaps' a number of smaller windows, such as windows 506, 508, 510, 512, and 514 together on the display screen 500 using the 'magnetization' function to form the larger picture of windows 502. Typically, the resulting picture of windows 502 may have a somewhat complex shape that may be other than a simple rectangle, depending on the respective dimensions of the smaller windows 506, 508, 510, 512, and 514 that form the larger picture of windows 502. Such a complex picture of windows may be very useful to a user, such as an FX trader, who needs to be able to view and interact with a group of such smaller windows at the same time in close proximity to one another.

Referring again to FIG. 5, the user may drag, for example, another smaller picture of windows 504 onto such complex picture of windows 502 in an overlapping or layering fashion. In the tabbing aspect, when the user drags a picture of windows, such as picture of windows 504, onto another picture of windows, such as picture of windows 502, in such a layered fashion, one or more tabs 516 may appear on the overlapping picture of windows 504 that correspond to one or more component windows 506, 508, 510, 512, and 514 of the overlapped picture of windows 502. Thus, the user may simply select and click on one of the displayed tabs 516 to bring a particular overlapped window to the front of the display.

A related aspect of the GUI management systems and methods for embodiments of the invention may be, for example, an 'always active' aspect in which all windows are always live. Thus, regardless of where windows are located on the display screen or where the focus of the user's mouse (or other device that controls the position of a cursor on the display screen) is located on the display screen, every window is always active. For example, a user may trade on a particular price tile with a single click, and it is not necessary to click first to activate the window and then to click a second time to execute the trade. Accordingly, in the tabbing aspect, all of the windows including, for example, all of the price windows, in both the overlapped 502 and overlapping 504 pictures of windows are active and tradable regardless of the focus of the user's mouse at any given time. Thus, the user, such as an FX trader, may click once on any of the price windows components of the overlapping picture of windows 504 to execute a trade. The user, such as the FX trader may also click once on one of the always active tabs 516 corresponding to one of the price window components of the overlapped picture of windows 502, which are likewise always active and tradable, to bring it forward.

In the tabbing aspect, the user may also create a pagination effect with multiple windows, such as price windows. For example, the user may drag a succession of any number of windows to superpose one another (i.e., to place one over the other so they coincide), whereupon an always-active tab, similar to those illustrated in FIG. 5, may appear on the uppermost window corresponding to each succeeding, superposing window. Further, each and every one of the superposed windows always remains active and tradable. It is to be understood that in embodiments of the invention, the always-active function of windows includes constantly updating the data for each window, for example, whether or not the user's mouse is focused on a particular window or whether or not a particular window is overlapped or superposed. Accordingly, each and every window is constantly updated with information, such as current price information, on a real-time basis. Thus, a user, such as an FX trader, may click on any price window at any time to execute a trade. It is to be noted that the dimensions of an overlapping or superposing window or overlapping picture of windows may impose a limit on the number of tabs corresponding to the overlapped windows or pictures of windows that may be displayed. Thus, when the number of tabs becomes excessive because of the number of overlapped or superposed windows or pictures of windows, the tabs may be replaced by a dropdown list of the superposed or overlapped windows or pictures of windows.

Another related aspect of the GUI management systems and methods for embodiments of the invention may be, for example, a floating windows aspect in which multiple windows may be opened, and all windows float. In such aspect, there is no concept of an application window per se. Thus, windows may be dragged to any position on the display screen or from one display screen to another. However, the windows remember where they were located on the user's desktop, regardless of how many monitors the user may have and can be moved into any space on the user's desktop.

Figure 6:
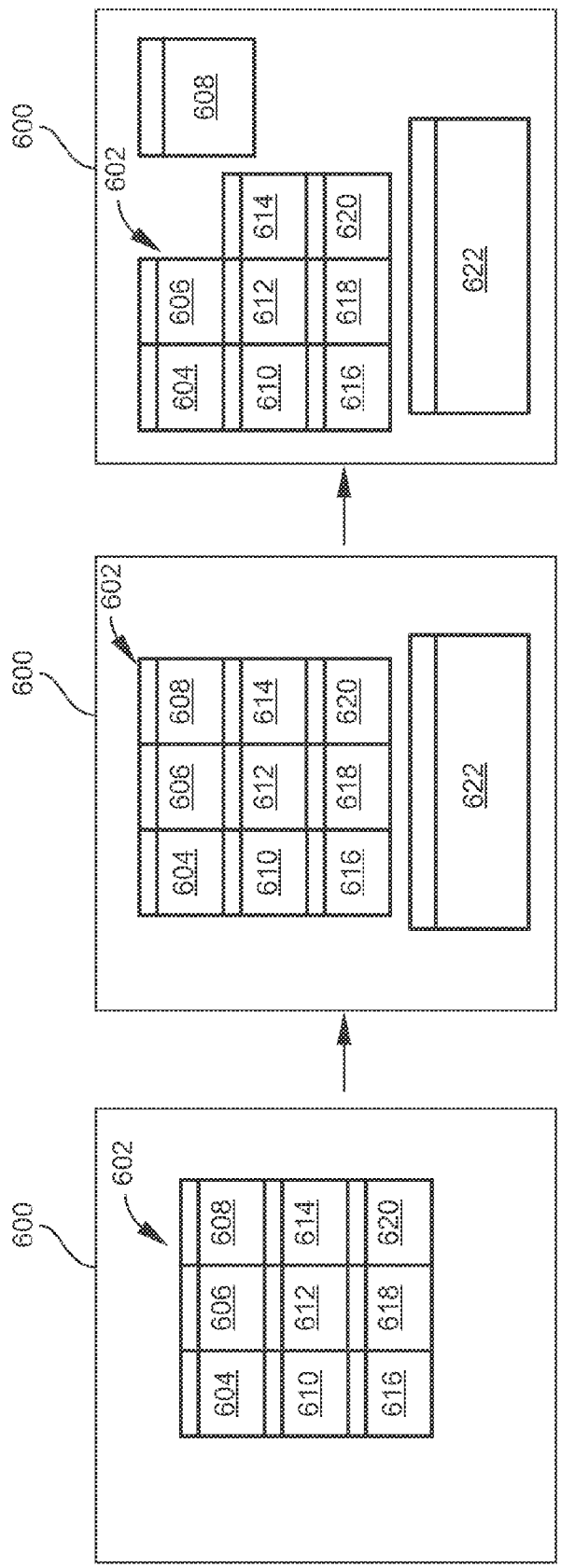
FIG. 6 illustrates another example of the dynamic resizing of windows aspect for embodiments of the invention.

FIG. 6 illustrates another example of the dynamic resizing of windows aspect for embodiments of the invention. Referring FIG. 6, assume for example that a user has a number of price windows 604, 606, 608, 610, 612, 614, 616, 618, 620 magnetized or docked together in a picture of windows 602 on the display screen 600. Assume also that the user launches a group of G10 (i.e., ten most stable currencies worldwide) currency prices window 622 on the display screen 600. In order to accommodate space on the display screen 600 when the group of G10 currency prices window 622 is launched, the price windows 604, 606, 608, 610, 612, 614, 616, 618, 620 that are docked together in the picture of windows 602 may all resize together at the same time because they are docked together. However, when one of the price windows, such as price window 608, is undocked from the picture of windows 602, the undocked window 608 recognizes that while it is of the same functional type as the price windows 604, 606, 610, 612, 614, 616, 618, 620 remaining in the picture of windows 602, it may resize independently of the widows remaining in the picture of windows because it is now in free space. When the undocked price window 608 in free space is resized to a larger scale, additional features that were not previously displayed on the undocked price window may be displayed. Likewise, when the undocked price window 608 in free space is resized to a smaller scale, the additional features may disappear from the display.

Figure 7:
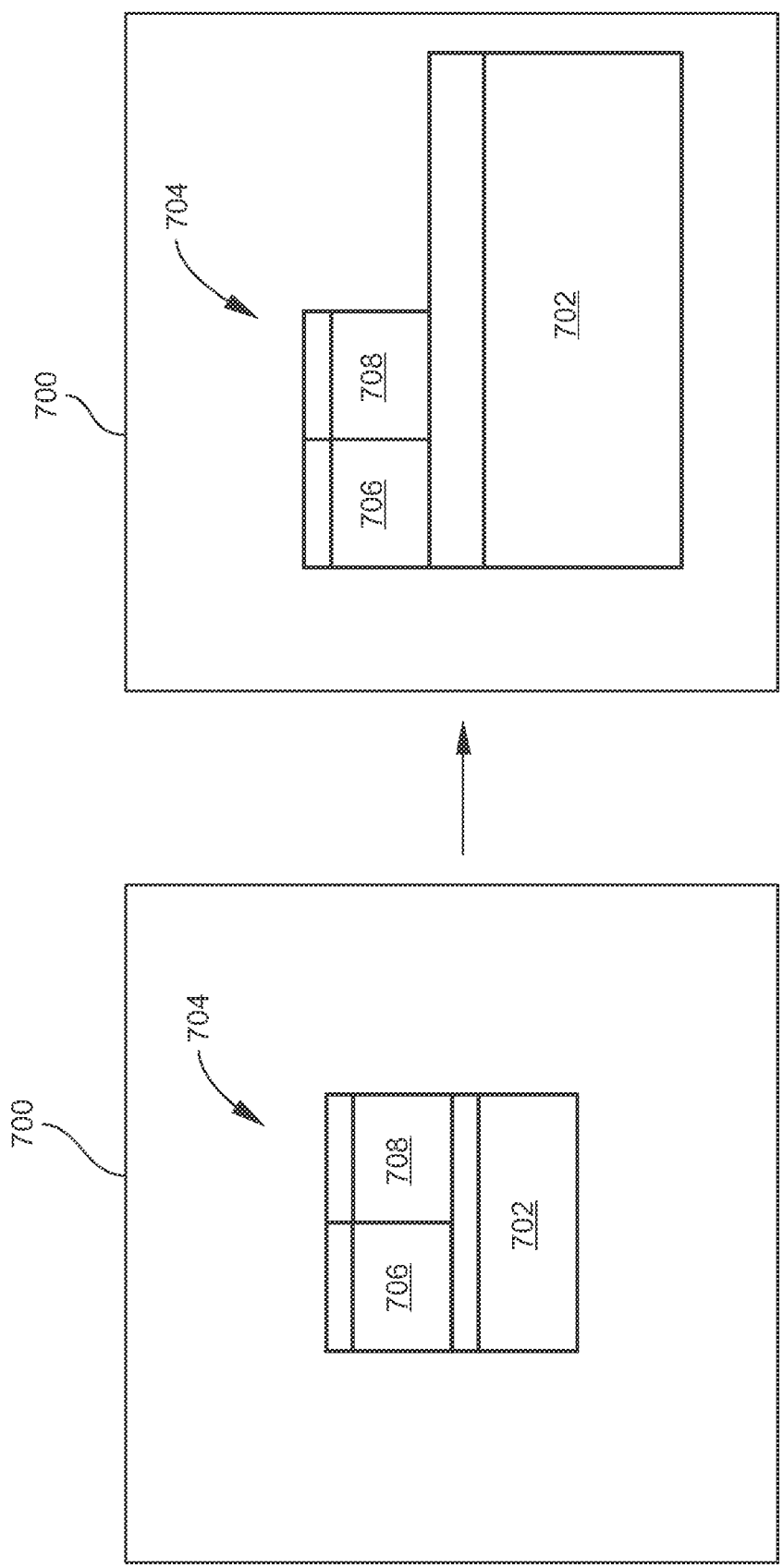
FIG. 7 illustrates a further example of the dynamic resizing of windows aspect for embodiments of the invention.

FIG. 7 illustrates a further example of the dynamic resizing of windows aspect for embodiments of the invention. Referring to FIG. 7, when a window of a different functional type, such as a chart type window 702, is magnetically stuck or docked to a picture of windows 704 including, for example, price windows 706 and 708, it may resize independently of the price windows 706, 708 in the picture of windows 704 because it recognizes that it is a different functional type than the other windows 706, 708 in the picture of windows 704. Likewise, as illustrated in FIG. 2, price tiles 202, 204 docked together in a picture of windows 206 may be resized together at the same time independently of a chart window, such as window 208, that is docked to the picture of windows 206. Thus, although the chart window 702 may be docked to the picture of windows 704 and may be dragged around on the display screen 700 as part of the picture of windows 704, it resizes independently of the price windows 706, 708 of the picture of windows 704 because it is of a different window type than the price windows 706, 708. On the other hand, when the chart type window 702 in FIG. 7 is undocked from the picture of windows 704 and in free space, resizing the price type windows 706, 708 has no effect on the chart type window 702, and resizing the chart type window 702 likewise has no effect on the price type windows 706, 708. Further, when the price type windows 706, 708 in the picture of windows 704 are resized, the height-to-width ratio of the price type windows is locked and remains unchanged.

Referring again to the illustration of the 'magnetization' aspect in FIG. 1, when the user drags a window 104 of a particular type into proximity to a stationary window 102, which is of the same functional type, an indicator may appear at or near a location where the moving window will meet the stationary window, such as at or near the leading edge 110 of the moving window 104. At that point, the user may release the window that is being dragged, whereupon its leading edge 110 may snap into aligned engagement with the nearest edge 108 of the stationary window 102. At the same time, if the moving window 104 of the particular type is larger or smaller than the stationary window of the same type, the moving window may also dynamically resize itself from such larger or smaller size to the same size as the stationary window 102. Thus, the adjacent edges 108, 110 of the two windows 102, 104 of the same type may become exactly the same length and perfectly aligned with one another. This is a feature which assures that the text and graphic components of windows of the same type in a picture of windows are aligned in a logical, easily readable sequence from one window to another whether they are arrange in a horizontal or a vertical sequence. It is noted that the sensitivity of the 'magnetization' or the distance between windows at which point the magnetization function becomes active may be a fixed parameter of the application or an adjustable parameter which the user may adjust.

Figure 8:
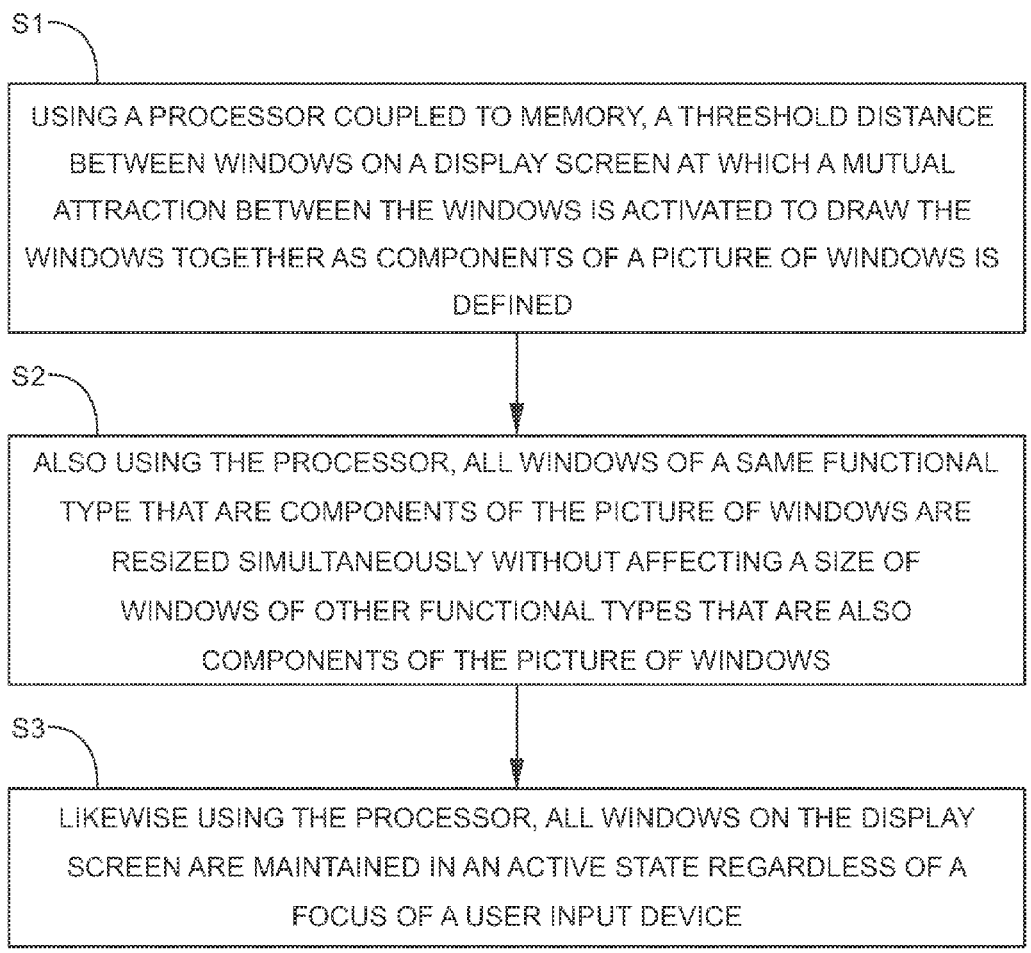
FIG. 8 is a flow chart that illustrates an overview example of the process of managing a GUI for embodiments of the invention.

FIG. 8 is a flow chart that illustrates an overview example of the process of managing a GUI for embodiments of the invention. Referring to FIG. 8, at S1, using a processor coupled to memory, a threshold distance between windows on a display screen at which a mutual attraction between the windows is activated to draw the windows together as components of a picture of windows may be defined. At S2, also using the processor, all windows of a same functional type that are components of the picture of windows are resized simultaneously without affecting a size of windows of other functional types that are also components of the picture of windows. At S3, likewise using the processor, all windows on the display screen are maintained in an active state regardless of a focus of a user input device.

It is to be understood that the application code for embodiments of the invention may be built, for example, in multiple layers (e.g., WPF, JAVA, C++, and C #) to allow its flexibility. It is to be further understood that embodiments of the invention may be implemented as processes of a computer program product, each process of which is operable on one or more processors either alone on a single physical platform, such as a personal computer, or across a plurality of devices, connected by a system or network, including networks such as the Internet, an intranet, a WAN, a LAN, a cellular network, or any other suitable communication network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public communication network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method for managing a graphical user interface, comprising:
    defining, using a processor coupled to memory, a threshold distance between an edge of a moving window that is not a component of a picture of windows and an edge of a stationary window of a same functional type that is a component of a picture of windows on a display screen at which a mutual attraction between the moving window and the stationary window is activated to draw the windows together as components of the picture of windows regardless of a state of alignment of the moving window and the stationary window relative to one another and without overlapping between the moving window and the stationary window; and
    resizing, using the processor, the moving window that is not a component of the picture of windows from a size larger or smaller than a size of the stationary window of the same functional type that is a component of the picture of windows to a same size as the size of the stationary window when the mutual attraction is activated.

2. The method of claim 1, further comprising resizing, using the processor, all windows of a same functional type that are components of the picture of windows simultaneously without affecting a size of windows of other functional types that are also components of the picture of windows.

3. The method of claim 1, further comprising maintaining, using the processor, all windows on the display screen in an active state regardless of a focus of a user input device with no visual indication of focus on any of the windows regardless of user input.

4. The method of claim 1, wherein defining the threshold distance between said edges of the moving window and the stationary window on the display screen at which the mutual attraction between the windows is activated regardless of the state of alignment of the windows relative to one another further comprises aligning the windows neatly and precisely to one another when the mutual attraction between the windows is activated.

5. The method of claim 1, wherein defining the threshold distance between said edges of the moving window and the stationary window on the display screen further comprises displaying an indicator on the display screen when the mutual attraction is activated.

6. The method of claim 5, wherein displaying the indicator on the display screen when the mutual attraction is activated further comprises deactivating the mutual attraction in response to a user input signal and overlapping or superposing the windows on the display screen.

7. The method of claim 1, further comprising moving all components of the picture of windows together as a single unit from one location to another location on the display screen displayed on one or more visual display units in response to a single input signal.

8. The method of claim 1, wherein defining the threshold distance between said edges of the moving window and the stationary window on the display screen further comprises defining the threshold distance for activation of mutual attraction between the windows as a fixed parameter.

9. The method of claim 1, wherein defining the threshold distance between said edges of the moving window and the stationary window on the display screen further comprises defining the threshold distance for activation of mutual attraction between the windows as a user-adjustable parameter.

10. The method of claim 2, wherein resizing all windows of the same functional type further comprises resizing all windows of the same functional type that are components of the picture of windows simultaneously in response to a single input signal.

11. The method of claim 2, wherein resizing all windows of the same functional type further comprises resizing all windows of the same functional type that are components of the picture of windows simultaneously without affecting the size of windows of different functional types that are components of the same picture of windows.

12. The method of claim 3, wherein maintaining all windows on the display screen in the active state further comprises maintaining all windows on the display screen in the active state while resizing.

13. The method of claim 12, wherein maintaining all windows on the display screen in an active state while resizing further comprises maintaining a data feed to all windows on the display screen while resizing.

14. The method of claim 3, wherein maintaining all windows on the display screen in the active state further comprises maintaining all overlapped or superposed windows on the display screen in the active state.

15. The method of claim 14, wherein maintaining all overlapped or superposed windows on the display screen in the active state further comprises providing active tabs on overlapping or superposing windows for all overlapped or superposed windows on the display screen.

16. A system for managing a graphical user interface, comprising:
    a processor coupled to memory, the processor being programmed for:
        defining a threshold distance between an edge of a moving window that is not a component of a picture of windows and an edge of a stationary window of a same functional type that is a component of a picture of windows on a display screen at which a mutual attraction between the moving window and the stationary window is activated to draw the windows together as components of the picture of windows regardless of a state of alignment of the moving window and the stationary window relative to one another and without overlapping between the edge of the moving window and the edge of the stationary window; and
        resizing the moving window that is not a component of the picture of windows from a size larger or smaller than a size of the stationary window of the same functional type that is a component of the picture of windows to a same size as the size of the stationary window when the mutual attraction is activated.

* * * * *